US008657670B2

(12) United States Patent
Johnson

(10) Patent No.: US 8,657,670 B2
(45) Date of Patent: Feb. 25, 2014

(54) DATA ACCESS AND COMMUNICATION SYSTEM

(75) Inventor: Stephen William Johnson, Rosebery (AU)

(73) Assignee: Aristocrat Technologies Australia Pty Ltd. (AU)

( * ) Notice: Subject to any disclaimer, the term of this patent is extended or adjusted under 35 U.S.C. 154(b) by 276 days.

(21) Appl. No.: 11/957,141

(22) Filed: Dec. 14, 2007

(65) Prior Publication Data

US 2008/0090649 A1 Apr. 17, 2008

Related U.S. Application Data

(63) Continuation of application No. 10/692,480, filed on Oct. 24, 2003, now abandoned.

(30) Foreign Application Priority Data

Oct. 29, 2002 (AU) ................................ 2002952317

(51) Int. Cl.
*A63F 13/00* (2006.01)

(52) U.S. Cl.
USPC ................................................ 463/25; 463/20

(58) Field of Classification Search
USPC ................................................ 463/16–22, 25
See application file for complete search history.

(56) References Cited

U.S. PATENT DOCUMENTS

| | | | | |
|---|---|---|---|---|
| 5,984,779 | A * | 11/1999 | Bridgeman et al. | 463/16 |
| 6,406,369 | B1 * | 6/2002 | Baerlocher et al. | 463/20 |
| 6,409,172 | B1 * | 6/2002 | Vancura | 273/256 |
| 6,416,409 | B1 * | 7/2002 | Jordan | 463/27 |
| 6,443,837 | B1 | 9/2002 | Jaffe et al. | |
| 6,481,717 | B1 | 11/2002 | Richardelle | |
| 6,520,856 | B1 | 2/2003 | Walker et al. | |
| 6,612,927 | B1 | 9/2003 | Slomiany et al. | |
| 6,634,946 | B1 * | 10/2003 | Bridgeman et al. | 463/28 |
| 2003/0119579 | A1 * | 6/2003 | Walker et al. | 463/20 |
| 2003/0155716 | A1 * | 8/2003 | Parker | 273/292 |
| 2004/0185932 | A1 * | 9/2004 | Lombardo | 463/21 |
| 2004/0235542 | A1 * | 11/2004 | Stronach et al. | 463/6 |

* cited by examiner

*Primary Examiner* — Omkar Deodhar
*Assistant Examiner* — Eric M Thomas
(74) *Attorney, Agent, or Firm* — McAndrews, Held & Malloy, Ltd.

(57) ABSTRACT

A gaming machine has a display and a game controller arranged to control images of symbols displayed on the display. The game controller is arranged to play a game wherein at least one random event is caused to be displayed on the display and, if a predefined winning event occurs, the machine awards a prize. The gaming machine includes a determining module for determining whether or not at least one further prize, following the awarding of an initial prize, is to be awarded, the determining module using the value of that initial prize in determining the probability of the player successfully winning the at least one further prize.

17 Claims, 2 Drawing Sheets

DATA ACCESS AND COMMUNICATION SYSTEM

RELATED APPLICATIONS

This application claims priority to and benefit as a continuation of U.S. patent application Ser. No. 10/692,480, filed on Oct. 24, 2003, entitled "Gaming Machine Feature," which claims priority to Australian Application No. 2002952317, filed on Oct. 29, 2002, each of which is herein incorporated by reference in its entirety.

FIELD OF THE INVENTION

This invention relates to a gaming machine. More particularly, the invention relates to a gaming machine and to an improvement to game features played on such a gaming machine.

BACKGROUND TO THE INVENTION

More and more gaming machines are offering games which have bonus features. These bonus game features are, normally, in the form of secondary features resulting from a trigger condition in a base game. The features often have higher payouts than the underlying base game. It is necessary to ensure that a theoretical return to player of a gaming machine incorporating such a feature does not exceed a certain amount which would render the gaming machine unprofitable to an operator of the gaming machine.

Legislation in various jurisdictions provides that a gaming machine must return a predetermined minimum amount, on average, to players. In the jurisdiction of New South Wales, Australia, the minimum return to player is set at 85% of the total amount wagered. Operators of the gaming machines are aware of this value and budget to receive their percentage as operating costs and as a source of revenue.

Were the gaming machines to exceed the minimum return to player, it could become unprofitable for operators of the gaming machines.

Further, certain of the game features offer the player various options where an apparent exercise of skill may be involved. This apparent exercise of skill may give the appearance of affecting the average return to player of the game. However, in reality, to ensure that the machines remain profitable for operators thereof, the exercise of skill by the player cannot affect the average return to player but may affect the outcome of the feature.

SUMMARY OF THE INVENTION

According to a first aspect of the invention, there is provided a gaming machine having a display and a game controller arranged to control images of symbols displayed on the display, the game controller being arranged to play a game wherein at least one random event is caused to be displayed on the display means and, if a predefined winning event occurs, the machine awards a prize, the gaming machine including a determining module for determining whether or not at least one further prize, following the awarding of an initial prize, is to be awarded, the determining means using the value of that initial prize in determining the probability of the player successfully winning the at least one further prize.

The determining module may be implemented in software and forms part of the game controller.

In a preferred form of the invention, the game comprises an underlying base game and, when a predetermined trigger condition occurs in the base game, a game feature is awarded. The game feature may be a bonus game, a second screen feature, or the like. In general, the invention applies to the game feature but need not do so.

In one embodiment of the invention, any prize won may be in the form of a number of credits and a probability of success in winning any further prize may be determined based upon the average credits awarded to players of the game. More particularly, the probability of success may be determined so that the average number of credits won in respect of the game after completion of the determination of the probability of success is approximately the same as the number of credits won before the completion of the determination of the probability of success.

This embodiment of the invention may apply where, if the player elects to continue with the game, having already won at least one prize, the player risks losing at least a portion of the already won prize if any subsequent outcome is unsuccessful.

Another embodiment of the invention may comprise the addition of prizes to an already won prize to determine the probability of success of winning any further prizes.

The controller may have a plurality of pathways and the player may be able to choose one of the pathways as an initial step in playing the game. In each subsequent step of the game, assuming a preceding step resulted in a successful outcome, the player may be able to switch from one pathway to another pathway.

Further, in this embodiment of the invention, no loss of any already won prize or prizes occurs.

Each pathway may have a predetermined number of steps. Each pathway may have the same number of steps.

A numerical constant may be applied to each step in each pathway in determining the probability of successfully completing that step in the pathway if selected by the player, the numerical constant being related to an average prize won up to that point in the game. Corresponding steps in each of the pathways may have the same numerical constant associated with them.

In each step along the pathway, to determine if the player wins the prize associated with that step, ie obtains a successful outcome in that step, the probability is calculated using the numerical constant. The numerical constants may be predetermined. Typically, the numerical constant selected for the corresponding steps of each pathway may fall within a predetermined range.

The numerical constants may be determined such that the effect of a player switching pathways is obviated. In other words, the constants may be selected so that it is of no advantage or disadvantage which path is selected by the player. The possible prizes gained may be dependent on player selection and the probability of successfully winning any further prizes may be determined so that, overall, the average prize won remains the same.

According to a second aspect of the invention, there is provided a method of operating a gaming machine, the gaming machine having a display and a game controller arranged to control images of symbols displayed on the display, the game controller being arranged to play a game wherein at least one random event is caused to be displayed on the display means and, if a predefined winning event occurs, the machine awards a prize, the method including determining whether or not at least one further prize, following the awarding of an initial prize, is to be awarded by using the value of that initial prize in determining the probability of the player successfully winning the at least one further prize.

In one embodiment of the invention, any prize won may be in the form of a number of credits and the method may include determining the probability of success in winning any further prize based upon the average credits awarded to players of the game. The method may include determining the probability of success so that an average number of credits won in respect of the game after completion of the determination of the probability of success is approximately the same as the number of credits won before the completion of the determination of the probability of success.

The method may includes the player risking at least a portion of the already won prize if any subsequent outcome is unsuccessful.

In another embodiment of the invention, the method may include adding prizes to an already won prize to determine the probability of success of winning any further prizes. The controller may have a plurality of pathways and the method may include allowing the player to choose one of the pathways as an initial step in playing the game.

The method may include, in each subsequent step of the game, allowing the player to switch from one pathway to another pathway.

Each pathway may have a predetermined number of steps, with each pathway having the same number of steps and the method may include applying a numerical constant to each step in each pathway in determining the probability of successfully completing that step in the pathway if selected by the player, the numerical constant being related to an average prize won up to that point in the game. The method may include applying the same numerical constants to corresponding steps in each of the pathways.

The method may include predetermining the numerical constants before the game is played. The method may include determining the numerical constants such that the effect of a player switching pathways is obviated.

BRIEF DESCRIPTION OF THE DRAWINGS

The invention is now described by way of example with reference to the accompanying diagrammatic drawings in which:—

DETAILED DESCRIPTION OF THE DRAWINGS

Figure 1:
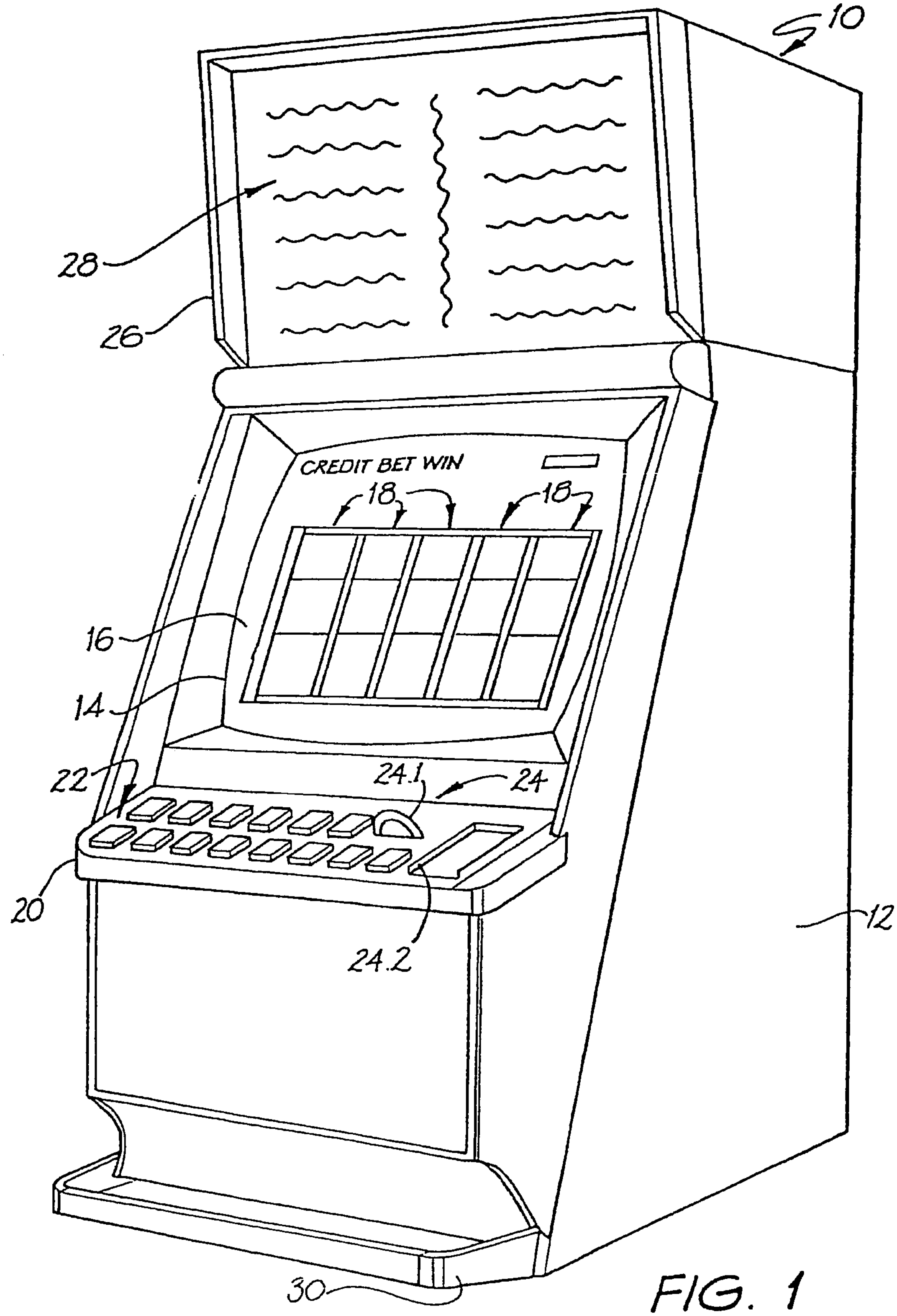
FIG. 1 shows a perspective view of a gaming machine, in accordance with the invention.

In FIG. 1, reference numeral 10 generally designates a gaming machine, including a game, in accordance with the invention. The machine 10 includes a console 12 having a display means in the form of a video display unit 14 on which a game 16 is played, in use. The video display unit 14 may be implemented as a cathode ray screen device, a liquid crystal display, a plasma screen, or the like. The game 16 is a spinning reel game which simulates the rotation of a number of spinning reels 18 and includes a bonus game feature. Typically the bonus game feature is awarded upon the occurrence of a trigger condition in the spinning reel game. A midtrim 20 of the machine 10 houses a bank 22 of buttons for enabling a player to play the game 16. The midtrim 20 also houses a credit input mechanism 24 including a coin input chute 24.1 and a bill collector 24.2.

The machine 10 includes a top box 26 on which artwork 28 is carried. The artwork 28 includes paytables, details of bonus awards, etc.

A coin tray 30 is mounted beneath the console 12 for cash payouts from the machine 10.

Figure 2:
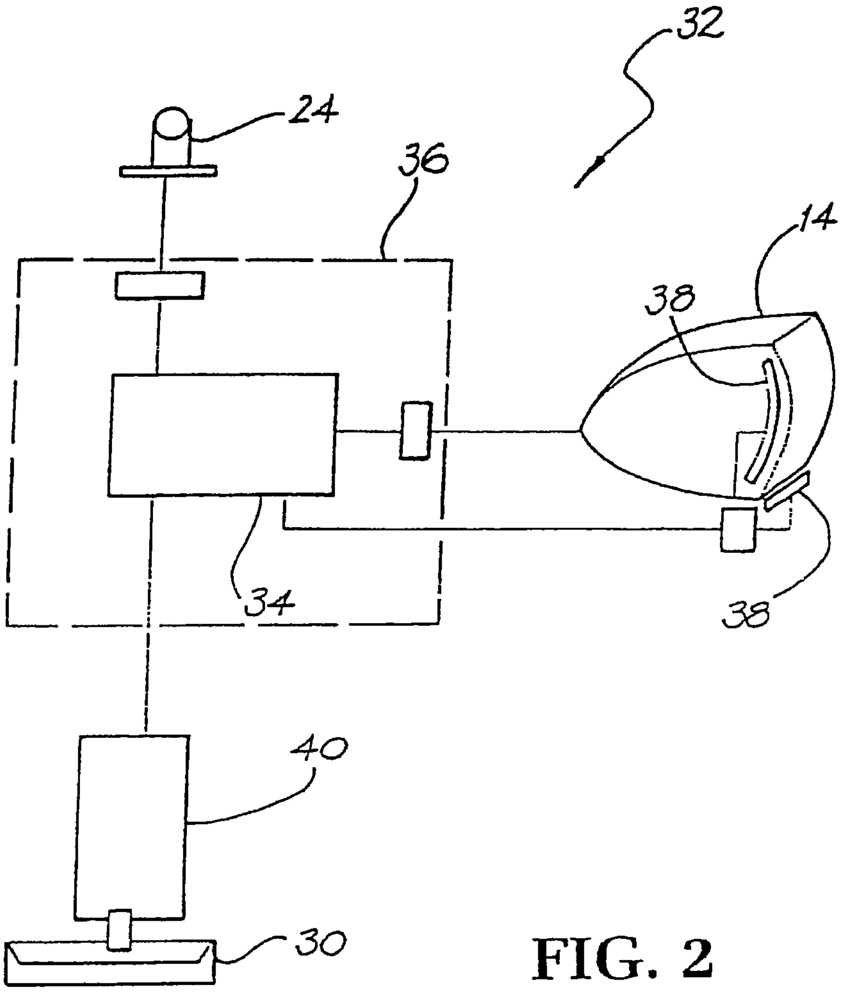
FIG. 2 shows a block diagram of a control circuit of the gaming machine.

Referring now to FIG. 2 of the drawings, a control means or control circuit 32 is illustrated. A program which implements the game and user interface is run on a processor 34 of the control circuit 32. The processor 34 forms part of a controller 36 that drives the screen of the video display unit 14 and that receives input signals from sensors 38. The sensors 38 include sensors associated with the bank 22 of buttons and touch sensors mounted in the screen of the video display unit 14. The controller 36 also receives input pulses from the mechanism 24 to determine whether or not a player has provided sufficient credit to commence playing. The mechanism 24 may, instead of the coin input chute 24.1 or the bill collector 24.2, or in addition thereto, be a credit card reader (not shown) or any other type of validation device.

The processor 34 includes a software implemented determining module that governs the awarding of prizes in a feature as will be described in greater detail below.

Finally, the controller 36 drives a payout mechanism 40 which, for example, may be a coin hopper for feeding coins to the coin tray 30 to make a pay out to a player when the player wishes to redeem his or her credit.

In determining the result of game features where player choice is involved, it is necessary for the processor 34 to ensure that the overall, average return to player of the gaming machine 10 on which the game feature is played remains at the chosen percentage. This also simplifies the mathematical calculations involved in determining returns to player as, where results may occur as a result of player choice, it would be necessary to take this into account in calculating the prizes awarded to the player and the return to player.

This invention relates to using the determining module of the processor 34 to ensure that the expected return to player of a gaming machine is unchanged where player choice is involved in playing a game feature. Two embodiments of the invention are described below.

In a first embodiment of the invention, a feature is awarded where, if a player continues playing the feature, a loss of at least a portion of the prize or prizes accumulated up to then in the feature may occur.

In playing the feature, it is assumed that at least one prize is awarded at random. This occurs as an initial step each time the feature is played and no player skill is involved. For ease of explanation, the already won prize or prizes are referred to below as the guaranteed prize.

After obtaining the guaranteed prize, the player is offered an opportunity of continuing to play the feature. The player thus has a prospect of adding to the guaranteed prize but with the risk of losing at least a portion of the guaranteed prize. Thus, if the player were to continue playing after the guaranteed prize had been won, the player risks losing, say, half of the guaranteed prize.

It is to be noted that, in each playing of the feature, the guaranteed prize won by a player need not always be the same amount of credits but varies with each playing of the feature. The value of the guaranteed prize is also determinative of the prospect of success should the player continue playing the feature. In other words, the more the player risks to gain an increased prize, the greater the probability of success to reflect the increased risk. The average return to player remains unaffected by the choice of the player but the specific prize changes with each playing of the feature.

In this embodiment, in each playing of the feature, a guaranteed prize is awarded at random. Any further prize offered may be known or unknown to the player and the player has the choice to try and win the further prize by risking a portion of the guaranteed prize already won.

The probability of successfully winning any additional prize, which may be a randomly determined prize or a fixed prize, is determined by the following equation where the probability of success, $P_S$, is between 0 and 1:

$$P_S = \text{number of credits gambled}/(\text{number of credits gambled} + \text{new credits to be gained}). \quad \text{Equation 1}$$

The average credits after the calculation has been completed is identical to the credits won by the player before the calculation has been completed. Using the example where the player has to risk half the credits comprising the guaranteed prize to gain the additional prize and assuming the guaranteed prize amounted to a total of 60 credits and the additional prize for which the player is playing is 10 credits, $$\begin{aligned} P_S &= 30/(30+10) \\ &= 0.75 \end{aligned}$$

using Equation 1 above. Conversely, the probability of failure, $P_F$, where the player would only win half the 60 credits, i.e. 30 credits, is:

$$\begin{aligned} P_F &= 1 - P_S \\ &= 1 - 0.75 \\ &= 0.25. \end{aligned}$$

It will therefore be noted that, overall, the average credits after the calculation is:

$$\begin{aligned} &0.75*70 + 0.25*30 \\ &= 52.5 + 7.5 \\ &= 60 \text{ credits.} \end{aligned}$$

As a second example of this embodiment, assuming the guaranteed prize amounted to 70 credits and half of those credits were then risked to gain another 10 credits:

$$\begin{aligned} P_S &= 35/(35+10) \\ &= 0.77777. \end{aligned}$$

Therefore, $$\begin{aligned} P_F &= 1 - 0.77777 \\ &= 0.22223 \end{aligned}$$

Therefore, in this example, overall, the average credits after the calculation is:

$$\begin{aligned} &0.77777*80 + 0.22223*35 \\ &= 62.22223 + 7.77777 \\ &= 70 \text{ credits.} \end{aligned}$$

In a second embodiment of the invention, it is assumed that no guaranteed prize is awarded in the playing of the feature but that a player has a choice of various pathways. Each pathway is made up of a number of steps and each step has a prize associated with it.

It will be appreciated that, in this embodiment of the invention there is no guaranteed prize so that, in the taking of a first step, a player could fail. In other words, moving from a start position may result in failure. Failure at the first step may result in the paying of a consolation prize. This needs to be taken into account in assessing the probability of success. It will also be appreciated that, should the player fail at taking the first step, the feature is regarded as concluded.

To allow a calculation of the probability of successfully taking any step to be determined, a numerical constant, related to an average prize accumulated by players up to that point in the feature, is associated with the taking of each step. As shown in Table 1 below, for the example indicated in that table, numerical constants of 9.9, 14.5 and 16.5 are associated with the taking of the first step, the second step and the third step respectively, in each pathway. It is to be noted that the corresponding step of each pathway has the same numerical constant associated with it. It is further to be noted that, for the first and second steps, the numerical constants need not be the same for each pathway provided they are below the value of the numerical constants for the third step which remains the same for each pathway.

TABLE 1

| | | | | |
|---|---|---|---|---|
| Start | 20 | 20 | 20 | Finish |
| Start | 15 | 15 | 15 | Finish |
| Start | 10 | 10 | 10 | Finish |
| Numerical constant (NC) | 9.9 | 14.5 | 16.5 | |

The numerical constants that are employed will only work on a limited amount of prize numbers and it is necessary to determine the numerical constant within a predetermined range. Further, it is to be noted that Table 1 is a simplified version of the table that will occur in a game feature and is shown in that format for ease of explanation. These numerical constants are, in fact, the average number of credits that are determined to be the average number of credits which have been accumulated by players up to that point of the feature.

It is also assumed that after the player has chosen an initial pathway, the player is not compelled to continue on that pathway. In other words, in taking the first step on a first pathway which results in a successful outcome the player then has the option, in taking the next step, to continue on the same pathway or at least taking the corresponding step on to an adjacent pathway. Thus, for example, in Table 1 above, if the player starts on the first pathway with prizes of 20 credits for each step then, if the player is successful after the first step, the player has the option of taking the second step on the same pathway for a further prize of 20 credits or taking a second step on to the middle pathway for a prize of 15 credits. If the player had started on the middle pathway and had a successful first outcome, the player would have three options for taking the second step, i.e. to move on to the first pathway, to continue on the second pathway or to move on to the third pathway.

The chance of winning any prize is calculated using the following mathematical formulae:

$$(\text{Prize})*P_{S0})+\text{Prize}\mathbf{1}*(P_{S1}+\ldots+P_{Sn})=NC_1;$$

$$(\text{Prize}\mathbf{0}*P_{S0})+\text{Prize}\mathbf{1}*(P_{S1}+\ldots+P_{Sn})+\text{Prize}\mathbf{2}*(P_{S2}+\ldots+P_{Sn})=NC_2$$

.

.

.

.

.

$$(\text{Prize0}*P_{S0})+\text{Prize1}*(P_{S1}+\ldots+P_{Sn})+\text{Prize2}*(P_{S2}+\ldots+P_{Sn})+\text{Prize3}*(P_{S3}+\ldots+P_{Sn})+\ldots+\text{Prizen}*(P_{Sn})=NC_n. \quad \text{Equation 2}$$

and $$P_{S0}+P_{S1}+P_{S2}+P_{S3}+\ldots+P_{Sn}=1 \quad \text{Equation 3}$$

where $P_{S1}$ to $P_{Sn}$ are, respectively, the probabilities of success of winning the first to the nth prizes;

$P_{S0}$ is the probability of failure in taking the first step;

Prize 0 is the consolation prize that may be awarded if the player fails in taking the first step. (It is to be noted that there is no guarantee that a consolation is payable where the player fails in taking the first step. It is at the discretion of the game designer as to whether or not to offer a consolation prize.); and $NC_1$ to $NC_n$ are, respectively, the numerical constants associated with the first to nth steps.

Using Table 1 above as an example, to determine if a player is going to be successful in taking a first step in the feature, a probability of success is calculated based on the first Numerical Constant in Table 1.

As a first example, the player is assumed to take a step along the first pathway for a prize of 20 credits. There are two possible outcomes which need to be taken into account being 20 credits for a successful outcome and 0 credits for an unsuccessful outcome, it being assumed in this example that no consolation prize is payable. The probability of each occurring can be calculated to lie between 0 and 1. Using Equations 2 and 3 above:

$$0*P_{S0}+20*(P_{S1}+P_{S2}+P_{S3})=9.9; \text{ and}$$

$$P_{S0}+P_{S1}+P_{S2}+P_{S3}=1.$$

Therefore, solving for $(P_{S1}+P_{S2}+P_{S3})$, which is the probability of successfully continuing with the feature, gives a value of 0.495 and a probability of failure, $P_{S0}$, of 0.505.

If, for the succeeding step, the player selects the middle prize of 15 credits, ie the second step along the middle pathway, there are two possible outcomes being a prize of 20 credits if the step results in an unsuccessful outcome and a prize of 35 credits if the prize results in a successful outcome. From the preceding calculation the probability of obtaining 0 credits is 0.505. Also, from Table 1 it is to be noted that the Numerical Constant associated with the second column is 14.5. Therefore, Equation 2 becomes:

$$0*P_{S0}+20*P_{S1}+35*(P_{S2}+P_{S3})=14.5$$

and Equation 3 becomes $$0.505+P_{S1}+P_{S2}+P_{S3}=1.$$

Solving Equations 2 and 3 for $P_{S1}$, the probability of successfully taking the first step but then not successfully continuing any further in the feature, and $(P_{S2}+P_{S3})$, the probability of successfully continuing beyond the second step in the feature, results in a probability of successfully continuing beyond the second step, $(P_{S2}+P_{S3})$, of 0.3067. This results in the probability of successfully taking the first step but then not successfully continuing any further in the feature of 0.1883.

Assuming that the player had been successful in the preceding steps, it is now assumed that, for the following step, it is assumed the player again chooses the top row, ie. the player attempts to win a further prize of 20 credits when taking the following step.

Applying Equations 2 and 3 again gives the following:

$$0*0.505+20*0.1883+35*P_{S2}+55*P_{S3}=16.5$$

and $$0.505+0.1883+P_{S2}+P_{S3}=1$$

Solving the two equations gives $P_{S2}=0.2067$. Hence, the probability of successfully completing the second step but then not successfully continuing any further in the feature is 0.2067. From this it can be determined that the probability of successfully completing the third step and, hence, the feature is:

$$P_{S3}=1-(0.505+0.1883+0.2067)=0.1.$$

This means that the player has a probability of completing the feature of 0.1.

Considering a second example, if the player starts, initially, at the third pathway in the hope of winning an initial prize of 10 credits there are, once again, two possible outcomes being a successful outcome resulting in a prize of 10 credits or an unsuccessful outcome resulting in a prize of 0 credits (because no consolation prize is payable in this example).

Once again, applying these figures to Equations 2 and 3 results in a probability of successfully continuing with the feature, $(P_{S1}+P_{S2}+P_{S3})$, of 0.99 and a probability of failure, $P_{S0}$, of 0.01.

Assuming, once again, that the player then selects the middle prize of 15 credits in the middle row for the next step, there are two possible outcomes being a prize of 10 credits for an unsuccessful outcome and a prize of 25 credits for a successful outcome.

Once again it needs to be taken into account that some players may have been unsuccessful in taking the first step. Applying Equations 2 and 3 again leads to the following:

$$0*P_{S0}+10*P_{S1}+25*(P_{S2}+P_{S3})=14.5$$

$$0.01+P_{S1}+P_{S2}+P_{S3}=1$$

Solving the above two equations for $(P_{S2}+P_{S3})$, the probability of successfully continuing with the feature is 0.3067 and the probability of successfully taking the first step in the feature but then not successfully continuing any further in the feature, $P_{S1}$, is 0.6833.

Assuming that the player now chooses the lowest pathway and had been successful in the previous steps, equations 2 and 3 become:

$$0*0.01+10*0.6833+25*P_{S2}+35*P_{S3}=16.5$$

and $$0.01+0.6833+P_{S2}+P_{S3}=1$$

which gives $P_{S2}=0.1067$ and $P_{S3}=0.200$

To determine if the player is going to be successful, prior to commencement of the feature, the controller 36 selects a random number in the range from 1 to 100. The probabilities at each step are summed and compared with the selected number. If the selected number falls within the range, the player is unsuccessful and the feature concludes.

Using the first example of the second embodiment described above, if, for example, the number selected is 72, then, in the case of the first step, the range is 1 to 50.5. Because the selected number falls outside the range, the player is successful and the feature continues. In the case of the next step, the range is 1 to 69.33 (1 to (50.5+18.83)). The player is again successful and the feature continues. In the following step, the range is 1 to 90 (1 to (69.33+20.67)). Because the selected number falls in this range, the player is unsuccessful, does not complete the third step and the feature concludes.

In both embodiments above, it will therefore be noted that in determining the probability of success of any subsequent step in a feature the value of an earlier prize is taken into account.

Accordingly, although pseudo skill is involved in that the player is offered the possibility of making selections, the controller 36 uses Equation 1 or Equations 2 and 3 in ensuring that the expected return to player remains the same independently of any selection made by the player. As a result, it is an advantage of the invention that the expected return to player of the gaming machine is not affected by any player choice.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method for use with a gaming system, the method comprising the steps of:

determining whether a first prize awarding condition occurs during a play of a first game by a player;

awarding the player a first number of credits in response to the first prize awarding condition occurring;

determining whether the player wants to wager a portion of the first number of credits in a second game for an opportunity to be awarded a second number of credits, wherein the second game is independent of the first game; and if it is determined that the player wants to wager the portion of the first number of credits, determining whether a second prize awarding condition occurs during the play of the second game, wherein a probability of the second prize awarding condition occurring is based on a function of the portion of the first number of credits and the second number of credits.

2. The method as claimed in claim 1 and further comprising the steps of:

if it is determined that the player wants to wager the portion of the first number of credits, deducting the portion of the first number of credits from the first number of credits; and if it is determined that the second prize awarding condition has occurred, adding the sum of the portion of the first number of credits and the second number of credits to the first number of credits remaining after said step of deducting.

3. The method as claimed in claim 1, wherein said function is $P_s=P_1/(P_1+P_2)$ where:

$P_s$=the probability of the second prize awarding condition occurring;

$P_1$=the portion of the first number of credits; and $P_2$=the second number of credits.

4. The method as claimed in claimed in claim 1, wherein the step of awarding the player the first number of credits is such that the first number of credits are randomly awarded during the play of the game, and the value of the number of credits is randomly determined.

5. The method as claimed in claim 1, wherein the second prize awarding condition is that it randomly occurs during the play of the game, and the value of the second number of credits is randomly determined.

6. A gaming system comprising an electronic game controller and a memory device comprising data, the electronic game controller and the memory device being arranged such that the electronic game controller can process the data, wherein processing of the data by the electronic game controller causes the electronic game controller to perform the following steps of:

determining whether a first prize awarding condition occurs during a play of a first game by a player;

awarding the player a first number of credits in response to the first awarding condition occurring;

determining whether the player wants to wager a portion of the first number of credits in a second game for an opportunity to be awarded a second number of credits, wherein the second game is independent of the first game; and if it is determined that the player wants to wager the portion of the first number of credits, determining whether a second prize awarding condition occurs during the play of the second game, wherein a probability of the second prize awarding condition occurring is based on a function of the portion of the first number of credits and the second number of credits.

7. The system as claimed in claim 6 wherein processing of the data by the electronic game controller causes the electronic game controller to perform the following steps of:

if it is determined that the player wants to wager the portion of the first number of credits, deducting the portion of the first number of credits from the first number of credits; and if it is determined that the second prize awarding condition has occurred, adding to the first number of credits the sum of the portion of the first number of credits and the second number of credits.

8. The system as claimed in claim 6, wherein the function is $P_s=P_1/(P_1+P_2)$ where:

$P_s$=the probability of the second prize awarding condition occurring;

$P_1$=the portion of the first number of credits; and $P_2$=the second number of credits.

9. The system as claimed in claimed in claim 6, wherein the step of awarding the player the first number of credits is such that the first number of credits are randomly awarded during the play of the game, and the value of the number of credits is randomly determined.

10. The system as claimed in claim 6, wherein the second prize awarding condition is that it randomly occurs during the play of the game, and the value of the second number of credits is randomly determined.

11. A method for providing a feature game in a gaming system having an underlying base game for play by a player, comprising:

triggering randomly a first prize awarding condition in connection with the play of a base game;

awarding the player a first prize of a first number of credits in response to said step of triggering;

wagering by the player a portion of said first number of credits in connection with the play of a feature game, wherein the feature game is independent of the base game;

play by the player of said feature game in response to said step of wagering; and awarding the player a second prize of a second number of credits in response to a second prize awarding condition occurring in the feature game, the probability of the second prize awarding condition occurring being a function of (1) said portion of said first number of credits and (2) said second number of credits.

12. A method according to claim 11 and further comprising:

offering the player an opportunity to continue to play the feature game after said step of awarding a first prize; and electing by the player to continue to play the feature game.

13. A method according to claim 11 and further comprising triggering a feature game following said step of awarding a first prize.

14. A method according to claim 11 wherein said step of wagering by the player includes selecting by the player the amount of said portion of said first number of credits.

15. A method according to claim 11 and further comprising:

using a number of credits to calculate said probability of the occurrence of said second prize award condition; and causing the occurrence of said second prize awarding condition in accordance with said probability.

16. A method according to claim 11 wherein said first number of credits varies during a number of plays of the base game.

17. A method according to claim 11 and further comprising:

displaying symbols on a display in response to a random event; and causing said step of triggering in association with said step of displaying.

* * * * *